(12) United States Patent
Kim (10) Patent No.: US 7,299,526 B2
(45) Date of Patent: Nov. 27, 2007

(54) ROTARY-TYPE HINGE DEVICE FOR A PORTABLE TERMINAL

(75) Inventor: Ju-Hee Kim, Gumi-si (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 0 days.

(21) Appl. No.: 10/967,236

(22) Filed: Oct. 19, 2004

(65) Prior Publication Data

US 2005/0160558 A1 Jul. 28, 2005

(30) Foreign Application Priority Data

Jan. 27, 2004 (KR) ...................... 10-2004-0005041

(51) Int. Cl.
*E05D 3/10* (2006.01)
(52) U.S. Cl. ..................................... 16/367
(58) Field of Classification Search .................. 16/367, 16/330, 303, 285, 284; 361/683; 455/575.1, 455/575.3; 379/433.13; 248/291.1, 292.11, 248/292.13
See application file for complete search history.

(56) References Cited

U.S. PATENT DOCUMENTS 7,096,540 B2 * 8/2006 Watanabe et al. ............. 16/367

2003/0040288 A1 * 2/2003 Kang et al. ................... 455/90
2005/0141703 A1 * 6/2005 Hickey et al. ......... 379/433.13
2005/0177978 A1 * 8/2005 Satoh et al. .................. 16/319
2005/0198779 A1 * 9/2005 Jung et al. .................... 16/367

FOREIGN PATENT DOCUMENTS

| EP | 1 353 488 | | 10/2003 |
| JP | 11182528 | A * | 7/1999 |
| JP | 11257342 | A * | 9/1999 |
| JP | 11257343 | A * | 9/1999 |

* cited by examiner

*Primary Examiner*—Chuck Y. Mah
(74) *Attorney, Agent, or Firm*—Roylance, Abrams, Berdo & Goodman, L.L.P.

(57) ABSTRACT

A rotary-type hinge device for a portable terminal for rotating the folder of the terminal from the body thereof about a first hinge axis and about a second hinge axis, which is perpendicular to the first hinge axis is provided. The rotary-type hinge device comprises a first hinge module coupled to the body and adapted to rotate the folder about the first hinge axis; a second hinge module coupled to the folder and adapted to rotate the folder about the second hinge axis, when the folder is rotated a predetermined angle or more about the first hinge axis; a guide provided on the first hinge module and positioned adjacently to the second hinge module; and a stopper provided on the second hinge module and adapted to limit the rotation of the folder about the second hinge axis, when the folder is rotated within a predetermined angle about the first hinge axis.

16 Claims, 8 Drawing Sheets

ROTARY-TYPE HINGE DEVICE FOR A PORTABLE TERMINAL

PRIORITY

This application claims the benefit under 35 U.S.C. § 119(a) of an application entitled "Rotary-Type Hinge Device Of Portable Terminal" filed with the Korean Intellectual Property Office on Jan. 27, 2004 and assigned Serial No. 2004-5041, the entire contents of which are incorporated herein by reference.

BACKGROUND OF THE INVENTION

1. Field of the Invention

The present invention relates to a hinge device for a portable terminal. More particularly, the present invention relates to a rotary-type hinge device adapted to open/close a flip or a folder of a portable terminal from/on the body of the terminal and to rotate the flip or folder, while it is opened, in such a manner that the front and rear surfaces thereof can be reversed.

2. Description of the Related Art

Typically, portable terminals are classified as bar-type terminals, flip-type terminals, or folder-type terminals according to their appearance.

Bar-type terminals have a single body housing, on which data input/output means and transmitter/receiver modules are positioned. Flip-type portable terminals have a body, a flip, and a hinge device for connecting the body to the flip. Folder-type terminal have a body, a folder, and a hinge device for rotatably connecting the body to the folder. The folder-type terminal is opened/closed as the folder is rotated and has the advantage of having a compact size. For this reason, folder-type terminals have been increasing in popularity.

Recently, a terminal has been manufactured which has a pair of housings adapted to be opened/closed through a sliding or swing motion while the housings are facing each other. A complex-type terminal also has been manufactured, which is configured as a folder-type terminal and can perform a swing motion.

An example of a hinge device for realizing the opening/closing motion of the complex-type terminal is disclosed in Korean Laid-Open Patent Publication No. 2003-17321 (Mar. 3, 2003) filed by the present applicant, which corresponds to U.S. Patent Application No. 226,712 (Aug. 23, 2002), the contents of which are hereby incorporated by reference. The hinge device is a rotary type and has a folder which can be rotated, while it is opened, in such a manner that the front and rear surfaces thereof can be reversed.

Portable terminals are undergoing rapid improvements not only in their appearance, but also in their function. For example, portable terminals equipped with camera lens assemblies already occupy a significant market share in the portable terminal market and the quality of the images produced are comparable to that of digital cameras.

However, it is inconvenient to take pictures or images with a camera lens assembly, which is positioned on a portable terminal, due to its position because portable terminals have been developed mainly as a communication device and their convenience as a photography device has not been sought. Such an inconvenience has been alleviated more or less by the complex opening/closing motion of folder-type terminals, such as a swing motion, reversion of the front and rear surfaces of the folder, and the like.

However, although the above-mentioned inconvenience of portable terminals as a photography device may be alleviated by the complex opening/closing motion, portable terminals still have a problem in that the motion cannot be performed in a stable manner. Moreover, the folder cannot be maintained in a stable state when it is opened. This makes it difficult to take pictures using the terminals.

SUMMARY OF THE INVENTION

Accordingly, the present invention has been made to solve the above-mentioned problems occurring in the prior art, and an object of the present invention is to provide a rotary-type hinge device capable of providing a stable opening/closing motion of a portable terminal having a folder adapted to be opened/closed through a complex motion.

Another object of the present invention is to provide a rotary-type hinge device of a portable terminal capable of continuously maintaining the folder of the terminal, when it is opened, in a stable state.

In order to accomplish this object, there is provided a rotary-type hinge device of a portable terminal for rotating the folder of the terminal from the body thereof about a first hinge axis and about a second hinge axis, which is perpendicular to the first hinge axis. The device comprises a first hinge module coupled to the body and adapted to rotate the folder about the first hinge axis; a second hinge module coupled to the folder and adapted to rotate the folder about the second hinge axis, when the folder is rotated a predetermined angle or more about the first hinge axis; a guide provided on the first hinge module and positioned adjacently to the second hinge module; and a stopper provided on the second hinge module and adapted to limit the rotation of the folder about the second hinge axis, when the folder is rotated within a predetermined angle about the first hinge axis.

BRIEF DESCRIPTION OF THE DRAWINGS

The above and other objects, features and advantages of the present invention will be more apparent from the following detailed description taken in conjunction with the accompanying drawings, in which.

Throughout the drawings, it should be noted that the same or similar elements are denoted by like reference numerals.

DETAILED DESCRIPTION OF THE PREFERRED EMBODIMENTS

Hereinafter, embodiments of the present invention will be described with reference to the accompanying drawings. In the following description of exemplary embodiments of the present invention, a detailed description of known functions and configurations incorporated herein will be omitted for conciseness.

Figure 1:
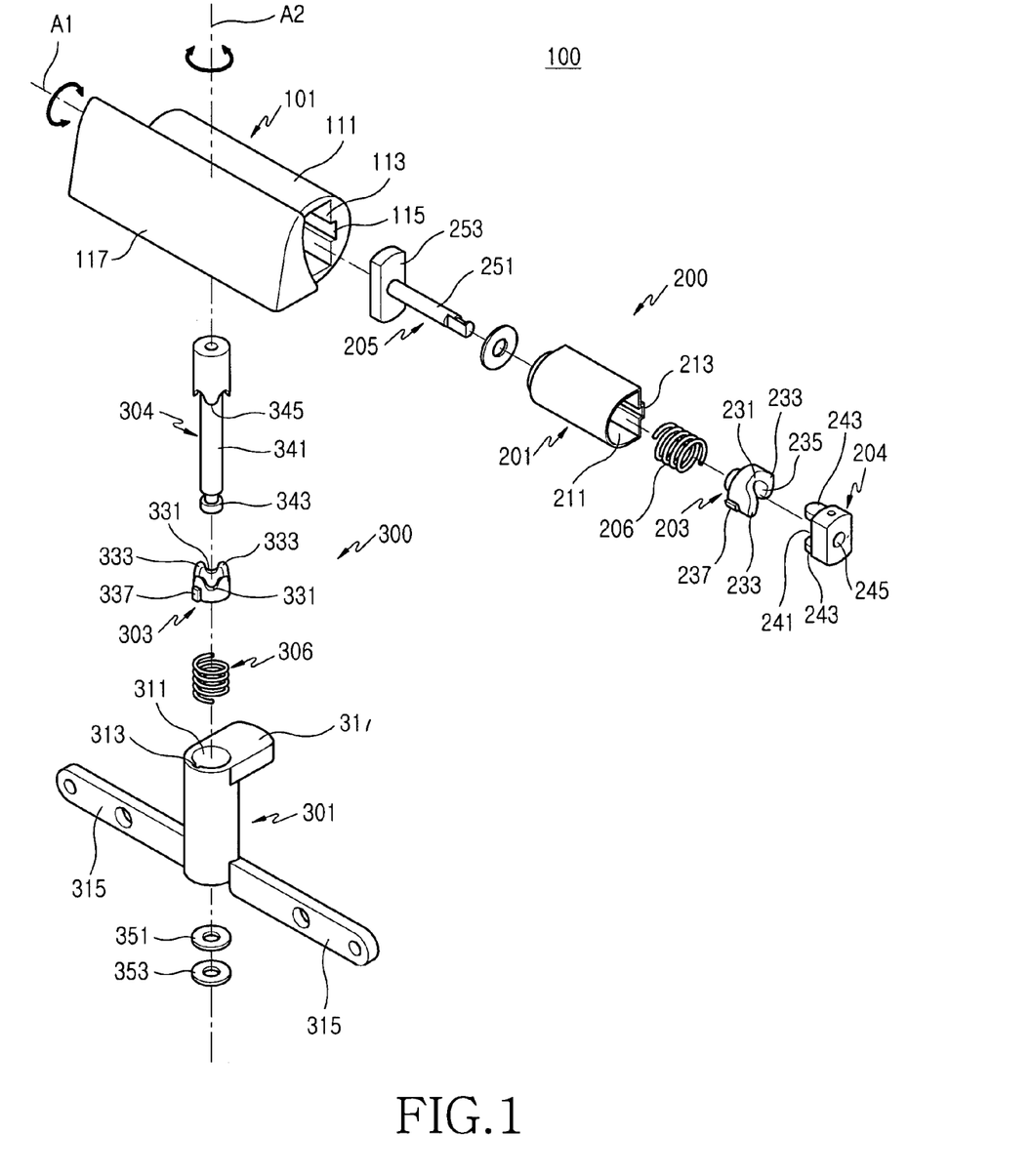
FIG. 1 is an exploded perspective view illustrating a rotary-type hinge device of a portable terminal according to an embodiment of the present invention.
Figure 2:
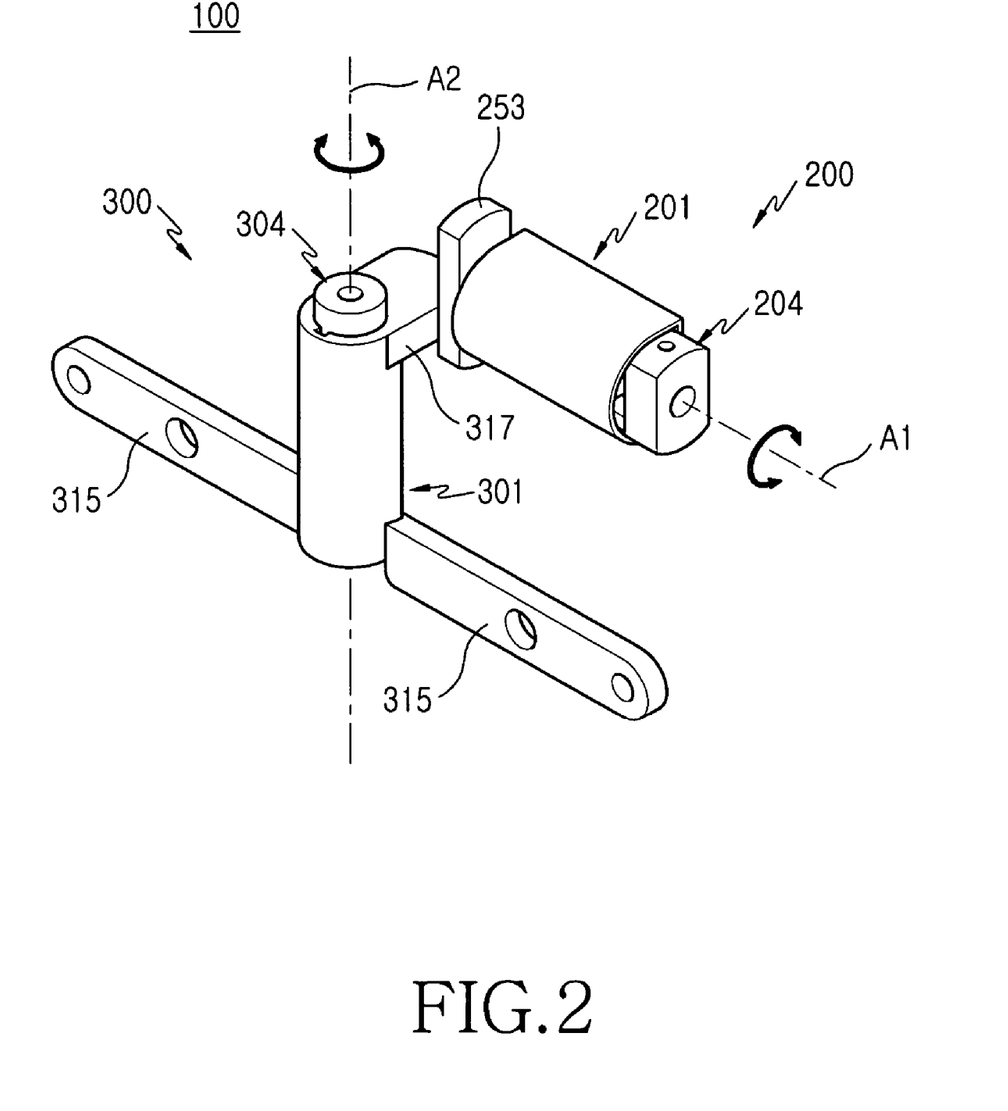
FIG. 2 is a perspective view illustrating the internal structure of the rotary-type hinge device of FIG. 1.

FIG. 1 is an exploded perspective view illustrating a rotary-type hinge device 100 of a portable terminal according to a preferred embodiment of the present invention and FIG. 2 is a perspective view showing the internal structure of the rotary-type hinge device 100 of FIG. 1. As shown in FIGS. 1 and 2, the rotary-type hinge device 100 of a portable terminal according to an embodiment of the present invention comprises a first hinge housing 101, a first hinge module 200, and a second hinge module 300.

The first hinge housing 101 has a center hinge arm 111 extending along a first hinge axis A1, as well as a folder base 117 formed on the center hinge arm 111 and extending along the first hinge axis A1. The center hinge arm 111 has a containing hole 113 formed on its end to contain the first hinge module 200 therein. The containing hole 113 has a guide groove 115 formed on its inner wall along its longitudinal direction. The second hinge module 300 is coupled to the inner wall of the first hinge housing 101 in a predetermined location. The second hinge module 300 has a rotary shaft 301 adapted to be rotated about a second hinge axis A2, which is perpendicular to the first hinge axis A1.

The first hinge module 200 comprises a second hinge housing 201, a hinge cam 203, a hinge shaft 204, a support shaft 205, and a coil spring 206. The support shaft 205 is provided with a guide plate 253 on its end.

The second housing 201 has the shape of a cylinder extending along the first hinge axis A1. An end of the second housing 201 is closed by the hinge shaft 204. The second housing 201 contains the hinge cam 203 and the coil spring 206 in its interior 211 and has a guide groove 213 formed on its inner wall along its longitudinal direction.

The hinge cam 203 has a through-hole 235 extending along the first hinge axis A1, as well as crests 233 and troughs 231 alternating along its circumferential direction. A guide protrusion 237 is formed on the outer peripheral surface of the hinge cam 203 and is adapted to move linearly in the guide groove 213 of the second hinge housing 201. Consequently, the hinge cam 203 can move linearly in the second hinge housing 201.

The hinge shaft 204 is assembled in such a manner that it protrudes out of an end of the second hinge housing 201 and has a through-hole 245 extending along the first hinge axis A1. The hinge shaft 204 has crests 243 and troughs 241 formed on its surface, which face the crests 233 and troughs 231 of the hinge cam 203. When the first hinge module 200 is contained in the first hinge housing 101, the hinge shaft 204 protrudes out of an end of the center hinge arm 111.

The coil spring 206 is supported on the inner wall of an end of the second hinge housing 201 and on the hinge cam 203 to provide a resilient force in such a direction that the hinge cam 203 is forced against the hinge shaft 204. As a result, respective crests and troughs formed on the hinge cams 203 and the hinge shafts 204 are continuously engaged with one another. If the hinge shaft 204 is rotated, a rotational force is generated and applied in such a direction that the respective crests and troughs are engaged with one another.

The support shaft 205 penetrates the second hinge housing 201 along the first hinge axis A1 and an end thereof is fixed on the hinge shaft 204. The guide plate 253, which is provided on the other end of the support shaft 205, is positioned adjacently to the exterior of an end of the second hinge housing 201.

If the first hinge housing 201 is rotated about the first hinge axis A1, the first hinge module 200 generates a rotational force in the direction of rotation of the first housing 201 or in the opposite direction, depending on the angle of rotation.

The second hinge module 300 comprises a rotary shaft 301, a rotary cam 303, a support shaft 304, and a coil spring 306. The rotary shaft 301 is adapted to be rotated about the second hinge axis A2.

The rotary shaft 301 has the shape of a cylinder extending along the second hinge axis A2 and contains the rotary cam 303 and the coil spring 306 in its interior 311. The rotary shaft 301 has a guide groove 313 formed on its inner wall along its longitudinal direction and a stopper plate 317 extending from the outer peripheral surface of an end thereof along its radial direction. The rotary shaft 301 also has a pair of fastening arms 315 extending from the outer peripheral surface of the other end thereof in a direction away from each other.

The rotary cam 303 has crests 333 and troughs 331 formed on its end while alternating along its circumferential direction. A guide protrusion 337 is formed on the outer peripheral surface of the rotary cam 303 and is adapted to move linearly in the guide groove 313 of the rotary shaft 301. Consequently, the rotary cam 303 can move linearly in the rotary shaft 301.

The support shaft 304 closes an end of the rotary shaft 301, extends through it, and protrudes out of the other end thereof. The support shaft 304 has a fastening groove 343 formed on its end, to which O-rings or E-rings 351 and 353 are fastened, when it protrudes out of the other end of the rotary shaft 301. Consequently, the support shaft 304 is rotatably coupled to the rotary shaft 301. The support shaft 304 also has crests 345 formed on its outer peripheral surface 341 in predetermined locations, which are adapted to face the crests 333 or the troughs 331 of the rotary cam 303. The support shaft 304, which is rotataby coupled to the rotary shaft 301, passes through the folder base 117 and is fixed on the inner wall of the first hinge housing 101. The fastening arm 315 of the rotary shaft 301 protrudes out of an end of the folder base 117.

The coil spring 306 is contained in the rotary shaft 301 and provides a resilient force in such a direction that the rotary cam 303 is forced against the crests 345 of the support shaft 304. As a result, the troughs 333 of the rotary cams 303 are engaged with the crests 345 of the support shaft 304. If the support shaft 304 is rotated relative to the rotary shaft 301, the resilient force from the coil spring 306 rotates the support shaft 304 in such a direction that the crests 345 are again engaged with the troughs 331 of the rotary cam 303.

The troughs 331 of the rotary cam 303 are preferably formed with an equiangular interval along the circumferential direction of the rotary cam 303 and, for example, they are formed with an interval of 90° in an embodiment of the present invention. The support shaft 304 is then adapted to stop rotating with an interval of 90°.

The stopper plate 317 interferes with the guide plate 253, depending on the angle of rotation of the first hinge housing 101 about the first hinge axis A1, and limits the rotation of the rotary shaft 301 about the second hinge axis A2. When the rotary shaft 301 is rotated about the second hinge axis A2, the stopper plate 317 limits the rotation of the first hinge housing 101 about the first hinge axis A1. If the first hinge housing 101 fails to be rotated a predetermined angle or more about the first hinge axis A1, the guide plate 253 limits the rotation of the rotary shaft 301. Accordingly, the rotary shaft 301 cannot be rotated until the first hinge housing 101 is rotated a predetermined angle or more.

If the first hinge housing 101 is rotated a predetermined angle or more and the rotary shaft 301 is rotated, the stopper plate 317 is positioned on a surface of the guide plate 253. In this state, the first hinge housing 101 cannot be rotated in such a direction that it returns to the pre-rotation position. This will be described in more detail with reference to FIGS. 3 to 8.

Figure 3:
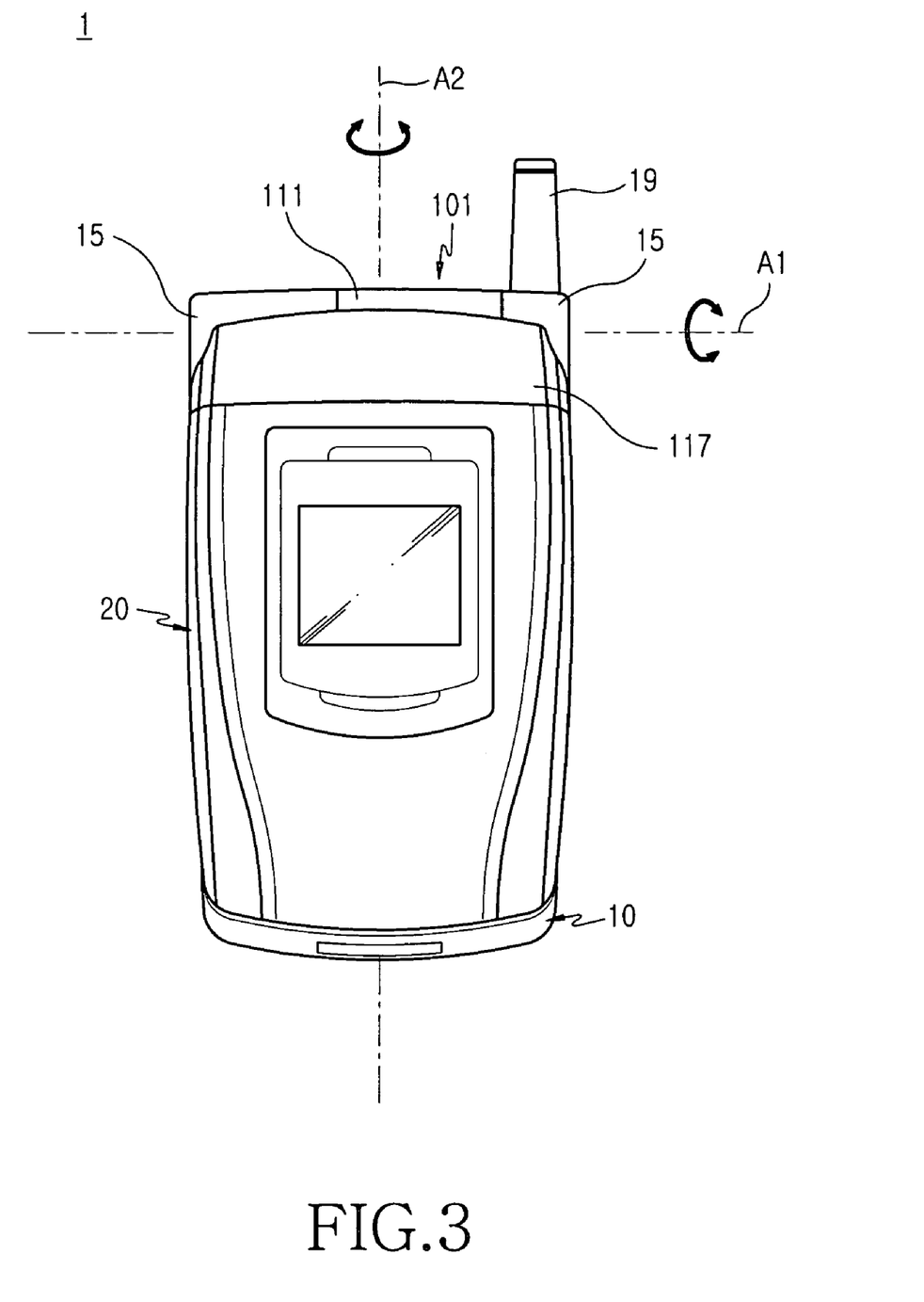
FIG. 3 is a perspective view illustrating a portable terminal equipped with the rotary-type hinge device of FIG. 1.
Figure 4:
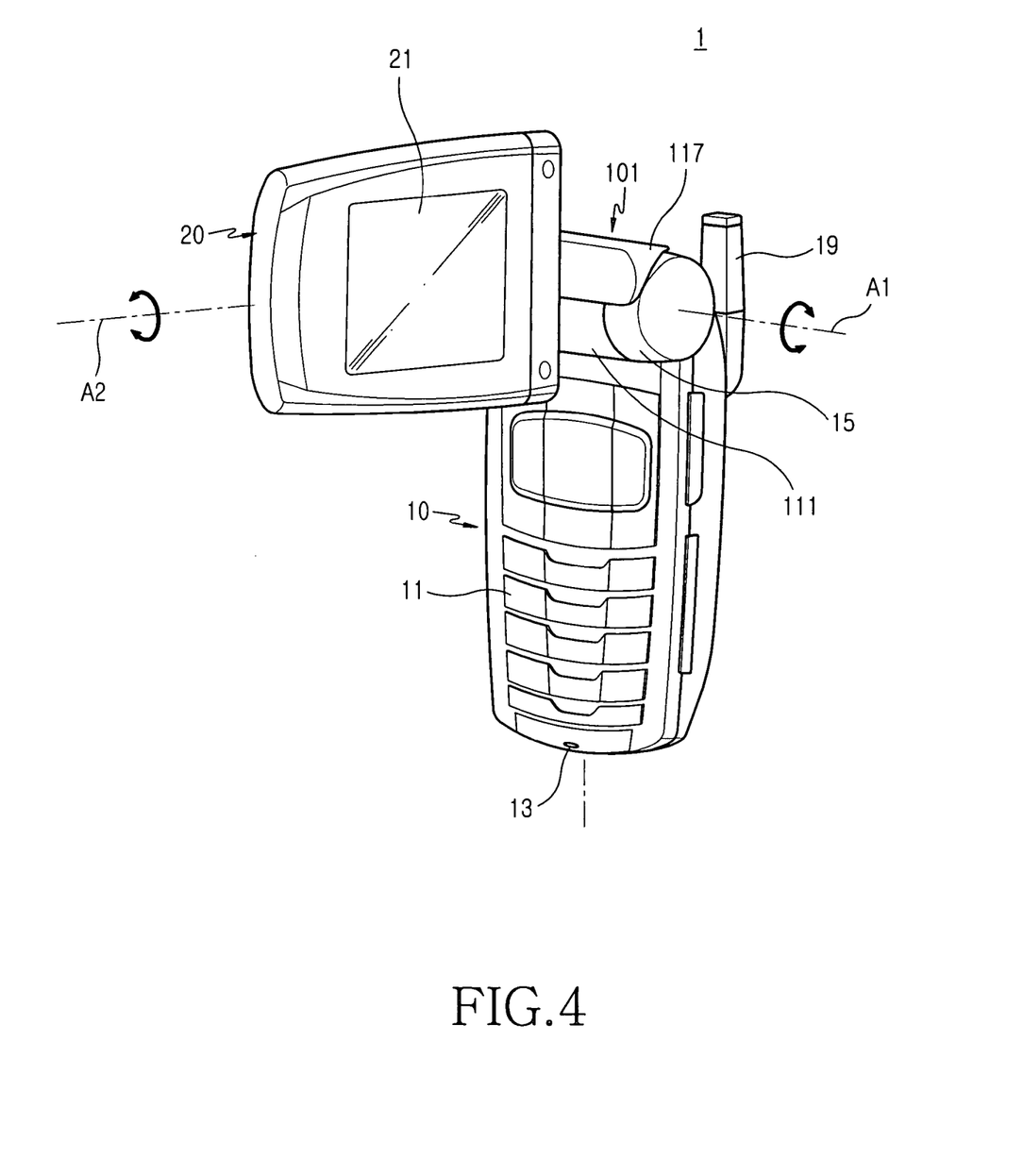
FIG. 4 is a perspective view illustrating the portable terminal of FIG. 3 wherein its folder is opened and rotated.

Referring to FIGS. 3 and 4, a portable terminal 1 equipped with the rotary-type hinge device 100 has a body 10 and a folder 20, both of which are rotataby coupled to each other by the hinge device 100.

The body 10 is provided with a keypad 11 and a microphone 13 on its front surface and an antenna device 19 on the upper end of its rear surface. The folder 20 is provided with a display device 21 on a surface which faces the body 10.

The body 10 is provided with a pair of side hinge arms 15 on the upper end of its front surface to accommodate the hinge device 100. Particularly, the center hinge arm 111 of the hinge device 100 is rotatably coupled between the pair of side hinge arms 15. The hinge shaft 204, which protrudes out of an end of the center hinge arm 111, is fixed on the internal surface of one of the side hinge arms 15.

If the first hinge housing 101 is rotated about the first hinge axis A1, the hinge cam 203 is rotated together. The crests and troughs of the hinge cam 203 and the hinge shaft 204 are then disengaged from one another and a rotational force is generated, which is applied in the direction of rotation or in the opposite direction, depending on the angle of rotation of the first hinge housing 101.

As the fastening arm 315 of the rotary shaft 301 is fixed on an end of the folder 20, the folder 20 is coupled on an end of the folder base 117 and then can be rotated about the second hinge axis A2.

Figure 6:
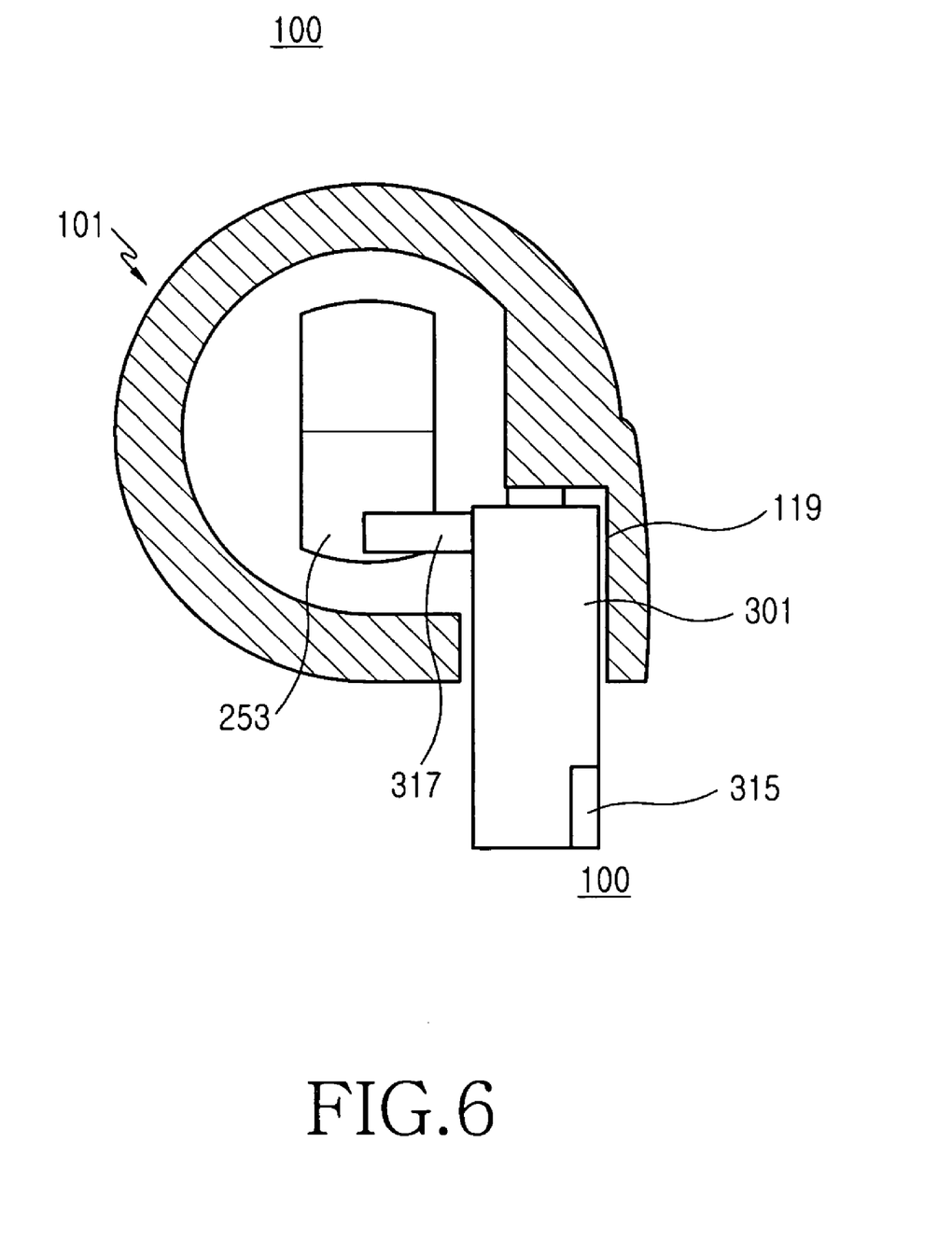
FIGS. 6 through 8 are diagrams illustrating the motion of the rotary-type hinge device of FIG. 1.

When the folder 20 folded on the body 10, as shown in FIG. 3, the first and second hinge modules 200 and 300 of the hinge device 100 are positioned in such a manner as shown in FIGS. 2 and 6. Particularly, the stopper plate 317 interferes with the guide plate 253 and limits the rotation of the rotary shaft 301 about the second hinge axis A2.

Figure 7:
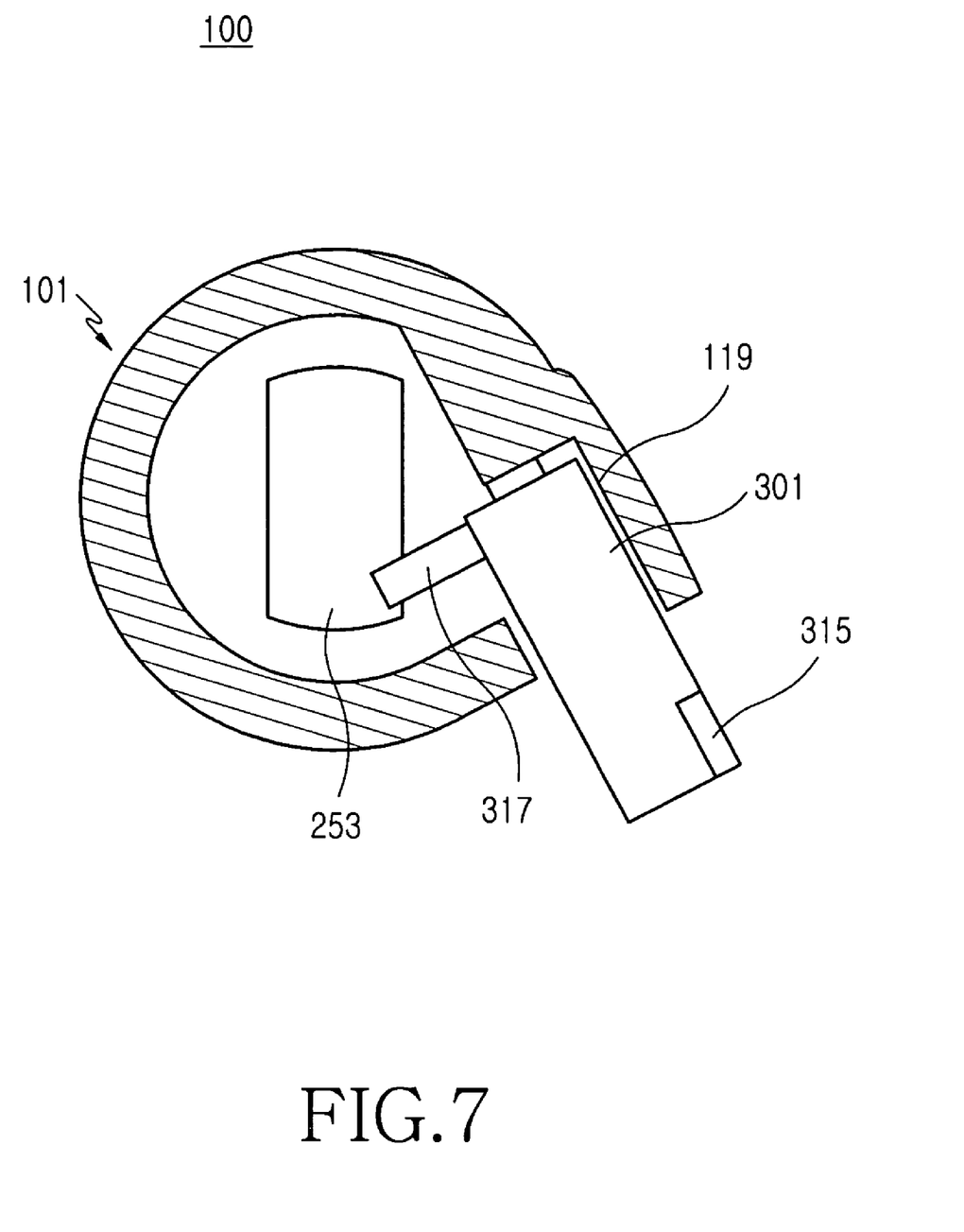

If the folder 20 and the first hinge housing 101 are rotated about the first hinge axis A1, as shown in FIG. 7, the stopper plate 317 is gradually disengaged from the guide plate 253.

Figure 5:
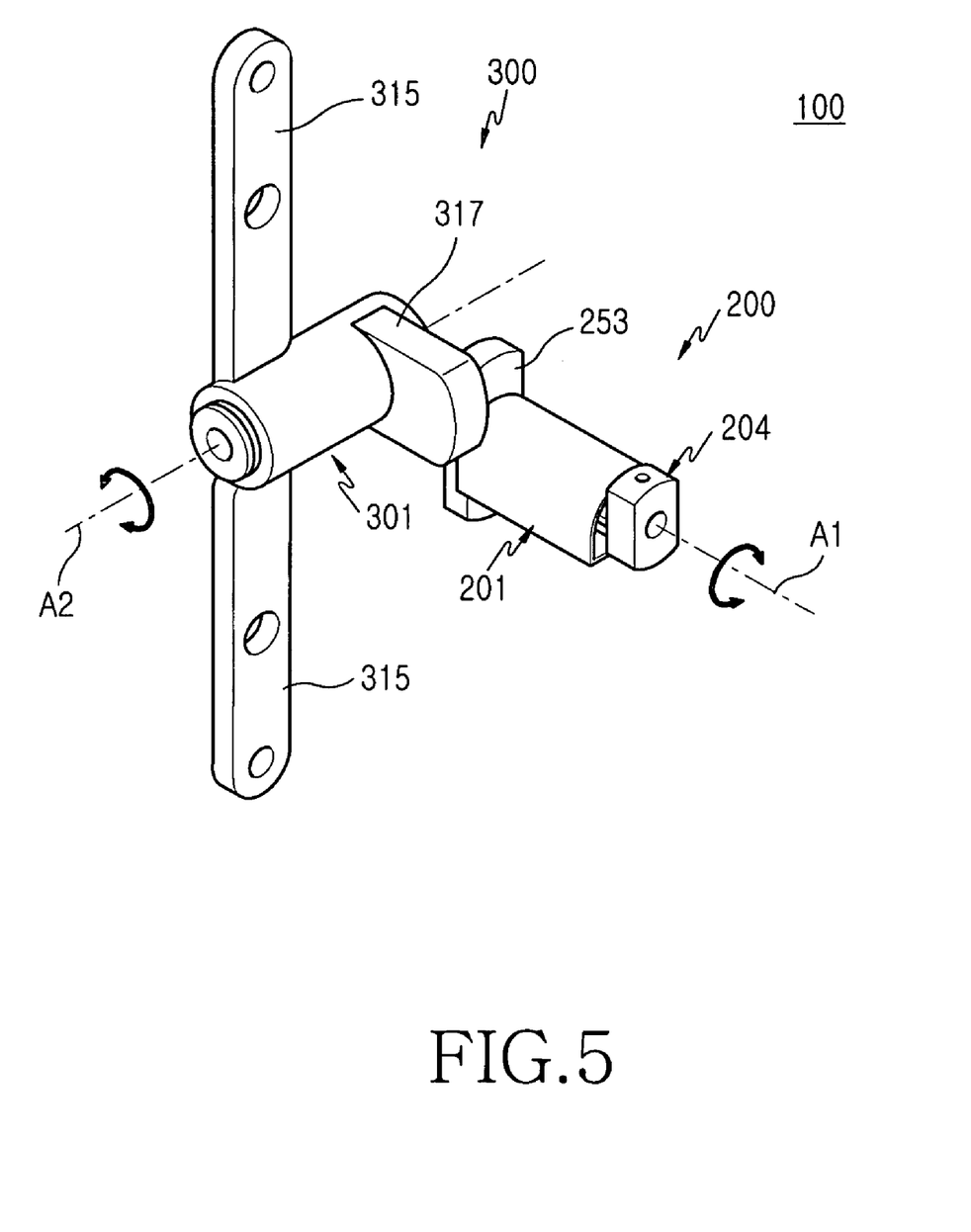
FIG. 5 is a perspective view illustrating the internal structure of a rotary-type hinge device of the portable terminal of FIG. 4 wherein its folder is opened and rotated.
Figure 8:
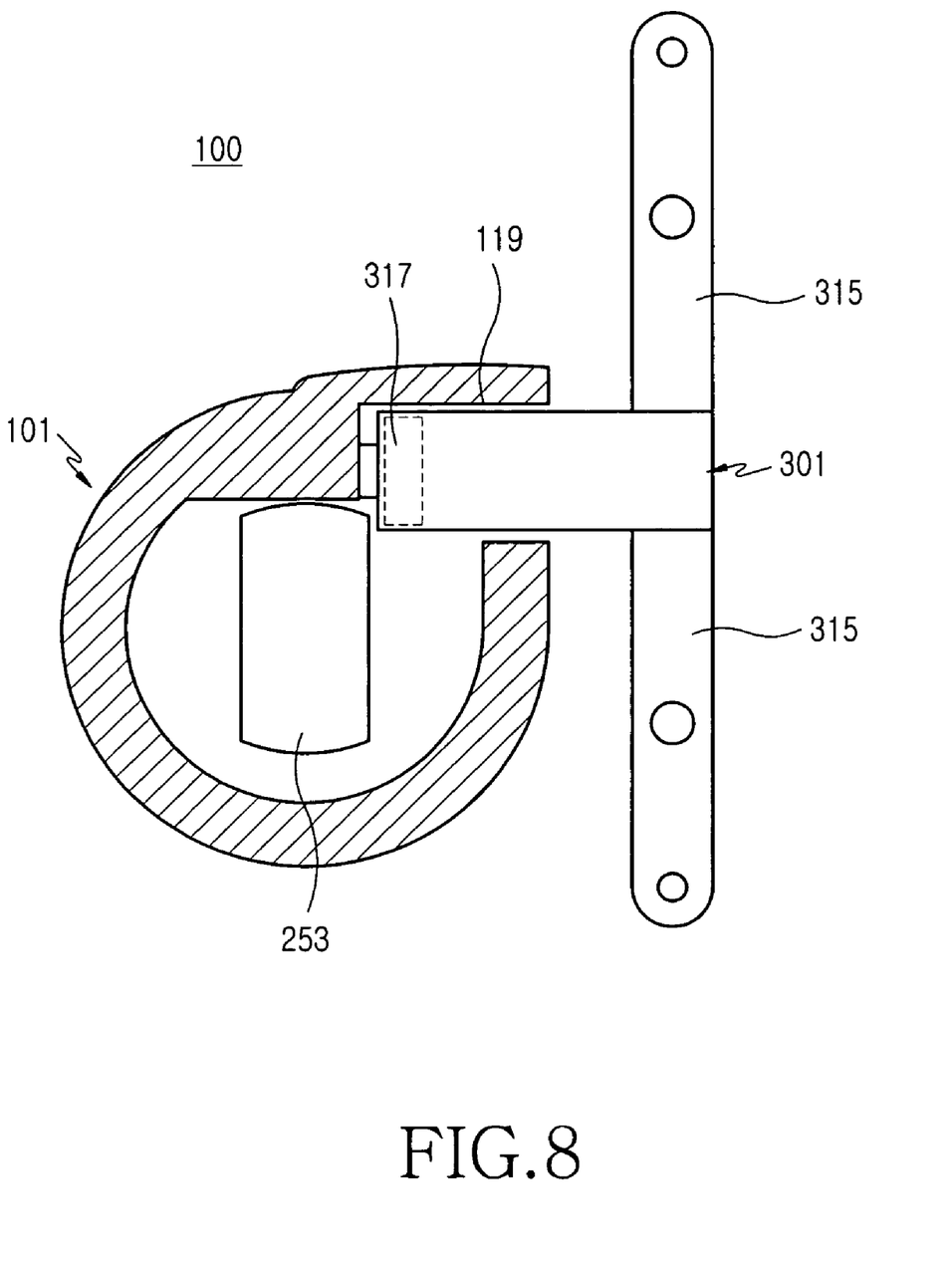

When the folder 20 and the first hinge housing 101 are rotated 90° or more about the first hinge axis A1, the folder 20 can be rotated about the second hinge axis A2. The rotation of the folder 20 about the second hinge axis A2 and the motion of the hinge device 100 are shown in FIGS. 4, 5, and 8. The present embodiment is configured in such a manner that, when the folder 20 and the first hinge housing 101 are rotated 90° or more from the body 10, the folder 20 can be rotated about the second hinge axis A2. If the folder 20 is rotated about the second hinge axis A2, the stopper plate 317 interferes with a lateral surface of the guide plate 253 and limits the rotation of the folder 20 about the first hinge axis A1 in a direction approaching the body 10.

When the folder 20 is rotated 90° about the second hinge axis A2, the stopper plate 317 interferes with the inner wall 119 of the first hinge housing 101 and limits further rotation of the folder 20 about the second hinge axis A2. If the troughs 331 of the rotary cam 303 are formed with an interval of 90°, the folder 20 is adapted to stop rotating with an interval of 90°. Accordingly, after being rotated 90° about the first hinge axis A1, as shown in FIG. 4, the folder 20 can be rotated again about the second hinge axis A2 and then continuously maintained in a stable state.

If the body 10 of the terminal is equipped with a camera lens assembly on a surface, it can be conveniently used for the user to take pictures of their self or of a desired object, after the folder 20 is rotated 90° about the first and second hinge axes A1 and A2, respectively. When the folder 20 is rotated 90° about the first and second hinge axes A1 and A2, respectively, the troughs 331 of the rotary cam 301 are engaged with the crests 345 of the support shaft 304 and, at the same time, the stopper plate 317 interferes with the inner wall 119 of the first hinge housing 101 and the lateral surface of the guide plate 253, so that the folder 20 is continuously maintained in a stable state.

Meanwhile, it has been described above and illustrated in the drawings, according to an embodiment of the present invention, that the guide plate 253 is positioned on a side of the stopper plate 317 and limits the rotation of the folder 20, which is adapted to be rotated about the first hinge axis A1, about the second hinge axis A2. However, it should be understood by those skilled in the art that the folder 20 can be rotated about the second hinge axis A2 in both clockwise and counterclockwise directions. Accordingly, guide plates may be positioned on both sides of the stopper plate 317 to limit the rotation of the folder 20 about the second hinge axis A2 in both clockwise and counterclockwise directions.

As described above, the rotary-type hinge device of a portable terminal according to an embodiment of the present invention has a stopper plate and a guide plate, which are positioned perpendicularly to each other, so that the rotation and maintaining of the folder can be stabilized. Therefore, the device can be applied to a terminal which is equipped with a camera lens assembly and is conveniently used to take pictures.

While the invention has been shown and described with reference to certain embodiments thereof, it should be understood by those skilled in the art that various changes in form and details may be made therein without departing from the spirit and scope of the invention as defined by the appended claims.

What is claimed is:

1. A rotary-type hinge device of a portable terminal for rotating a folder of the terminal from a body of the portable terminal about a first hinge axis and about a second hinge axis, which is perpendicular to the first hinge axis, the device comprises:
   a first hinge module coupled to the body and adapted to rotate the folder about the first hinge axis;
   a second hinge module coupled to the folder and adapted to rotate the folder about the second hinge axis, when the folder is rotated at or greater than a predetermined angle about the first hinge axis;
   a first hinge housing coupled on the body, the first hinge housing being adapted to be rotated about the first hinge axis and accommodating the first and second hinge modules;
   a guide provided on the first hinge module and positioned adjacent to the second hinge module; and
   a stopper provided on the second hinge module wherein the stopper interferes with the guide so as to limit the rotation of the folder about the second hinge axis, when the folder is rotated within the predetermined angle about the first hinge axis,
   wherein the stopper is adapted to interfere with the inner wall of the first hinge housing so as to limit further rotation of the folder about the second hinge axis, when the folder is rotated a predetermined angle about the second hinge axis after being rotated 90° from the body.

2. A rotary-type hinge device of a portable terminal as claimed in claim 1, wherein the guide is a guide plate which is provided on an end of the first hinge module and which is positioned adjacent to the second hinge module.

3. A rotary-type hinge device of a portable terminal as claimed in claim 1, wherein the stopper is a stopper plate which is provided on an end of the second hinge module and which extends in a direction perpendicular to the second hinge axis.

4. A rotary-type hinge device of a portable terminal as claimed in claim 3, wherein the guide plate and the stopper plate are adapted to interfere with each other and limit the rotation of the folder, when the folder is rotated within 900 from a position where it is unfolded on the body.

5. A rotary-type hinge device of a portable terminal as claimed in claim 1, wherein the guide is a guide plate which is provided on an end of the first hinge module and which is positioned adjacent to the second hinge module and the stopper is a stopper plate which is provided on an end of the second hinge module, which extends in a direction perpendicular to the second hinge axis, and which is adapted to interfere with the guide plate.

6. A rotary-type hinge device of a portable terminal as claimed in claim 1, wherein when the folder is rotated 90° in a clockwise or counterclockwise direction about the second hinge axis, the stopper interferes with the inner wall of the first hinge housing.

7. A rotary-type hinge device of a portable terminal as claimed in claim 1, wherein the stopper is adapted to interfere with a lateral surface of the guide, when the folder is rotated about the second hinge axis, so as to limit the rotation of the folder about the first hinge axis in a direction approaching the body.

8. A rotary-type hinge device of a portable terminal for rotating a folder of the terminal from a body of the portable terminal about a first hinge axis and about a second hinge axis, which is perpendicular to the first hinge axis, the device comprises:
 a first hinge module coupled to the body and adapted to rotate the folder about the first hinge axis;
 a second hinge module coupled to the folder and adapted to rotate the folder about the second hinge axis, when the folder is rotated at or greater than a predetermined angle about the first hinge axis;
 a first hinge housing coupled on the body, the first hinge housing being adapted to be rotated about the first hinge axis and accommodating the first and second hinge modules;
 a guide provided on the first hinge module and positioned adjacent to the second hinge module; and
 a stopper provided on the second hinge module wherein the stopper interferes with the guide so as to limit the rotation of the folder about the second hinge axis, when the folder is rotated within the predetermined angle about the first hinge axis;
 wherein the second hinge module includes
  a rotary shaft having the shape of a cylinder extending along the second hinge axis,
  a coil spring included in the rotary shaft, the coil spring being supported on the inner wall of an end of the rotary shaft and providing a resilient force along the second hinge axis,
  a rotary cam included in the rotary shaft, the rotary cam being provided with the resilient force from the coil spring and having a number of troughs and crests formed on its surface while alternating along its circumferential direction, and
  a support shaft rotatably coupled to the other end of the rotary shaft, the support shaft extending through the rotary shaft along the second hinge axis and closing an end of the rotary shaft.

9. A rotary-type hinge device of a portable terminal as claimed in claim 8, wherein the support shaft is provided with at least one pair of a crest and trough formed in a predetermined location, which are adapted to be engaged with the crests and troughs of the rotary cam that is provided with the resilient force from the coil spring.

10. A rotary-type hinge device of a portable terminal as claimed in claim 9, wherein the rotation of the folder about the second hinge axis is stopped at an interval of 90°, as the crests and troughs of the rotary cam are engaged with the crest and trough of the support shaft.

11. A rotary-type hinge device of a portable terminal as claimed in claim 8, wherein the rotary shaft has a guide groove formed on its inner wall and extending along its longitudinal direction and the rotary cam has a guide protrusion protruding from the outer peripheral surface thereof and positioned in such a manner that it can move linearly in the guide groove, so that the rotary cam can move linearly in the rotary shaft.

12. A rotary-type hinge device of a portable terminal as claimed in claim 8 further comprising a first hinge housing coupled on the body, the first hinge housing being adapted to be rotated about the first hinge axis and containing the first and second hinge modules, and wherein the support shaft is fixed on the inner wall of the first hinge housing in a predetermined location.

13. A rotary-type hinge device of a portable terminal for rotating a folder of the terminal from a body of the portable terminal about a first hinge axis and about a second hinge axis, which is perpendicular to the first hinge axis, the device comprises:
 a first hinge module coupled to the body and adapted to rotate the folder about the first hinge axis;
 a second hinge module coupled to the folder and adapted to rotate the folder about the second hinge axis, when the folder is rotated at or greater than a predetermined angle about the first hinge axis;
 a first hinge housing coupled on the body, the first hinge housing being adapted to be rotated about the first hinge axis and accommodating the first and second hinge modules;
 a guide provided on the first hinge module and positioned adjacent to the second hinge module; and
 a stopper provided on the second hinge module wherein the stopper interferes with the guide so as to limit the rotation of the folder about the second hinge axis, when the folder is rotated within the predetermined angle about the first hinge axis;
 wherein the first hinge module comprises
  second hinge housing,
  a coil spring included in the second hinge housing, the coil spring being supported on the inner wall of a first end of the second hinge housing and providing a resilient force along the first hinge axis,
  a hinge cam included in the second hinge housing, the hinge cam being provided with the resilient force from the coil spring and having at least one pair of a trough and crest formed on its surface while alternating along its circumferential direction, and
  a hinge shaft rotatably coupled to a second end of the second hinge housing opposite to the first end of the second, the hinge shaft being fixedly coupled to the body and closing the other end of the second hinge housing.

14. A rotary-type hinge device of a portable terminal as claimed in claim 13 further comprising:
a support shaft fixedly coupled to the hinge shaft, the support shaft extending along the first hinge axis and protruding out of an end of the second hinge housing, and wherein the guide is positioned on an end of the support shaft.

15. A rotary-type hinge device of a portable terminal as claimed in claim 13, wherein the hinge shaft has a crest and a trough formed on its end, which are adapted to be engaged with the trough and the crest of the hinge cam that is provided with the resilient force from the coil spring.

16. A rotary-type hinge device of a portable terminal as claimed in claim 13, wherein the second hinge housing has a guide groove formed on its inner wall and extending along the first hinge axis and the hinge cam has a guide protrusion protruding from the outer peripheral surface thereof and positioned in such a manner that it can move linearly in the guide groove, so that the hinge cam can move linearly in the second hinge housing.

* * * * *